July 11, 1950     E. A. STALKER     2,514,459
DIRECT LIFT AIRCRAFT

Filed Aug. 9, 1946     4 Sheets-Sheet 1

INVENTOR.
Edward A. Stalker
BY
Marshal o Biebel
ATTORNEYS

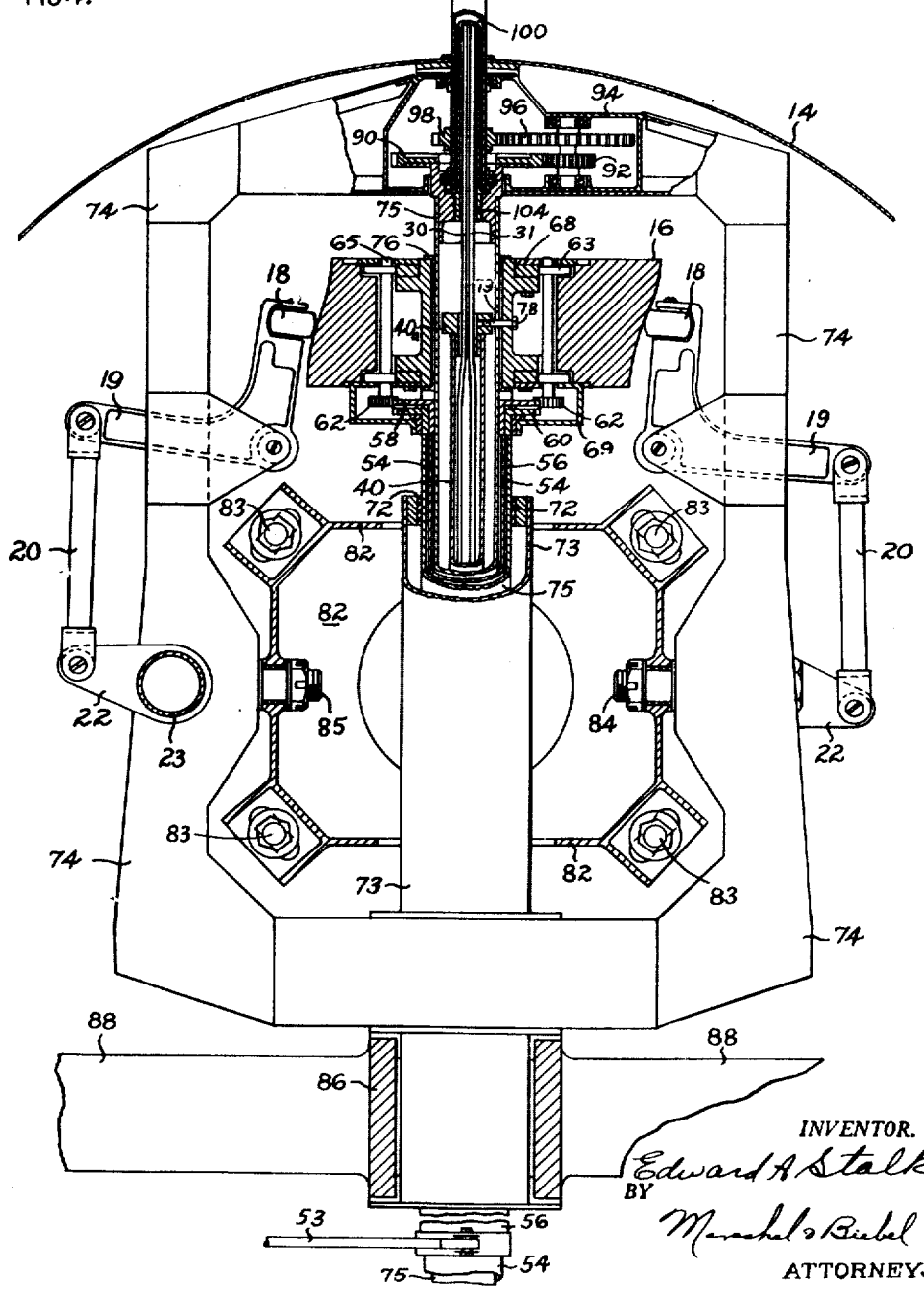

July 11, 1950  E. A. STALKER  2,514,459
DIRECT LIFT AIRCRAFT
Filed Aug. 9, 1946  4 Sheets-Sheet 3

INVENTOR.
Edward A. Stalker
BY
Marschal & Biebel
ATTORNEYS

July 11, 1950   E. A. STALKER   2,514,459
DIRECT LIFT AIRCRAFT
Filed Aug. 9, 1946   4 Sheets-Sheet 4

INVENTOR.
Edward A. Stalker
BY Marshall & Biebel
ATTORNEYS

Patented July 11, 1950

2,514,459

UNITED STATES PATENT OFFICE 2,514,459

DIRECT LIFT AIRCRAFT

Edward A. Stalker, Bay City, Mich.

Application August 9, 1946, Serial No. 689,449

6 Claims. (Cl. 170—160.15)

This invention relates to direct lift aircraft.

An object of the invention is to provide correct cyclic pitch control for each blade for a wide range of advance ratios, that is, the ratio of forward speed to tip peripheral speed of the lifting rotor.

Other objects will appear from the description, drawings and claims.

In the drawings:

Fig. 4 is a fragmentary section along the line 4—4 in Fig. 1 with the control arms rotated through 90°;

Cross reference is made to application Serial No. 619,974 filed October 3, 1945, now Patent No. 2,493,042, which shows a manually operated means for obtaining cyclic pitch control, the present application disclosing an automatic control of the cyclic pitch variations.

In contemporary helicopters the cyclic pitch control is accomplished by a swash plate which is universally mounted. Tilting of the plate imposes changes of pitch on opposite sides of the axis of rotation of the lifting rotor and these changes are dependent one on the other. If a certain degree of tilt properly changes the blade pitches for a certain advance ratio, a different degree of tilt for a different advance ratio cannot provide the proper pitch changes for opposite sides of the axis because of the permanent relation between opposite sides imposed by the swash plate.

The simple swash plate imposes a sinusoidal variation in pitch for each tilted position whereas a sinusoidal variation may be desirable only for one certain advance ratio. Such conventional swash plate constructions provide cyclic pitch control incorporating fixed relations between the pitches of blades on opposite sides of the axis, and may be considered as arbitrary pitch controls.

The present invention discloses a non-arbitrary pitch control. That is, the orbital pattern of pitch control changes with the advance ratio so that each blade is properly varied as to pitch to have the correct pitch setting in each point of its orbit. This is accomplished by providing a group of cam contours to give a group of pitch patterns about the orbit. These patterns are not determined by any arbitrary mechanical connection between the blades. For instance, they are not all derivable from a sinusoidal relation such as would be the case were they derived from a tiltable swash plate.

The body having this group of contours is referred to herein as a three-dimensional cam. Any one of the contours can be put into camming contact with a contactor or sensing element whose movements will alter the blade pitches in accordance with the contour contacted. It is only necessary to slide the cam along an axis to bring any contour in contact with the contactor.

The proper contour of the cam is selected automatically in accordance with the advance ratio.

Figure 5:
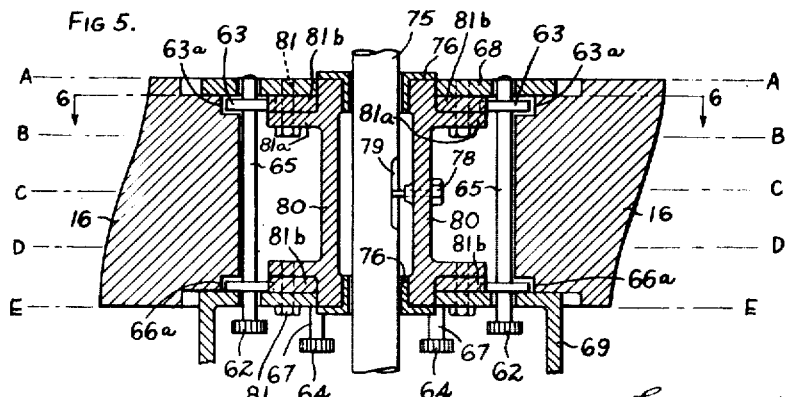
Fig. 5 is a sectional view of the three-dimensional cam and associated mechanism.
Figure 6:
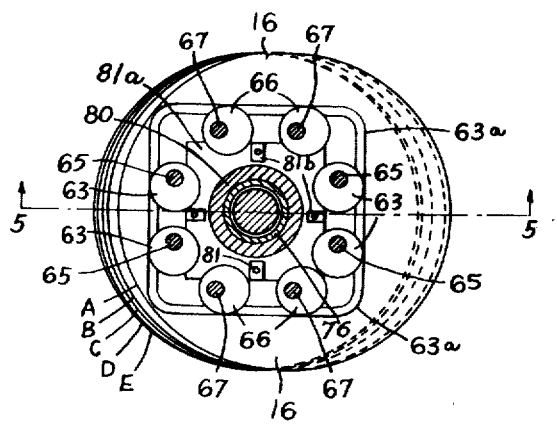
Fig. 6 is a view along the line 6—6 in Fig. 5.

Referring to the drawings which disclose a preferred embodiment of the invention, a helicopter 10, having a two-bladed rotor 12 and with flaps 15 supported in hub 14, is controlled by a device employing a three-dimensional cyclic control cam. The cam 16, as shown in Figs. 4, 5 and 6, has an infinite number of parallel contours A—A to E—E, Fig. 5. The bottom contour E—E is a circle about the axis. At horizontal planes in succession upward the contours become progressively more unsymmetrical. A contactor or sensing element 18 is in rolling contact with the cam surface and is connected to the flap of one of the blades through bell crank 19, rod 20, crank 22, and flap torque tube 23 which is directly connected to the flap adjusting mechanism, not shown in detail. A corresponding contactor on the opposite side of cam 16 and similar operating mechanism provide for operaion of the flap of the opposite rotor blade in a similar manner but in opposite phase relation thereto.

The contactors cause movements of the flaps of the advancing and retreating blades respectively up and down. The cam 16 is designed so that each contour suits a particular advance ratio. Therefore, as the cam is slid vertically relative to and in contact with contactors 18, the flaps are moved the proper amount up and down to keep the blade forces balanced for the prevailing advance ratio. Such movement of the flaps produces a change in the effective pitch of the blades similar to that which would be obtained by bodily rotation of the blade, and is the preferred manner of obtaining the desired change of pitch and the accompanying change of lift of the blade.

Figure 9:
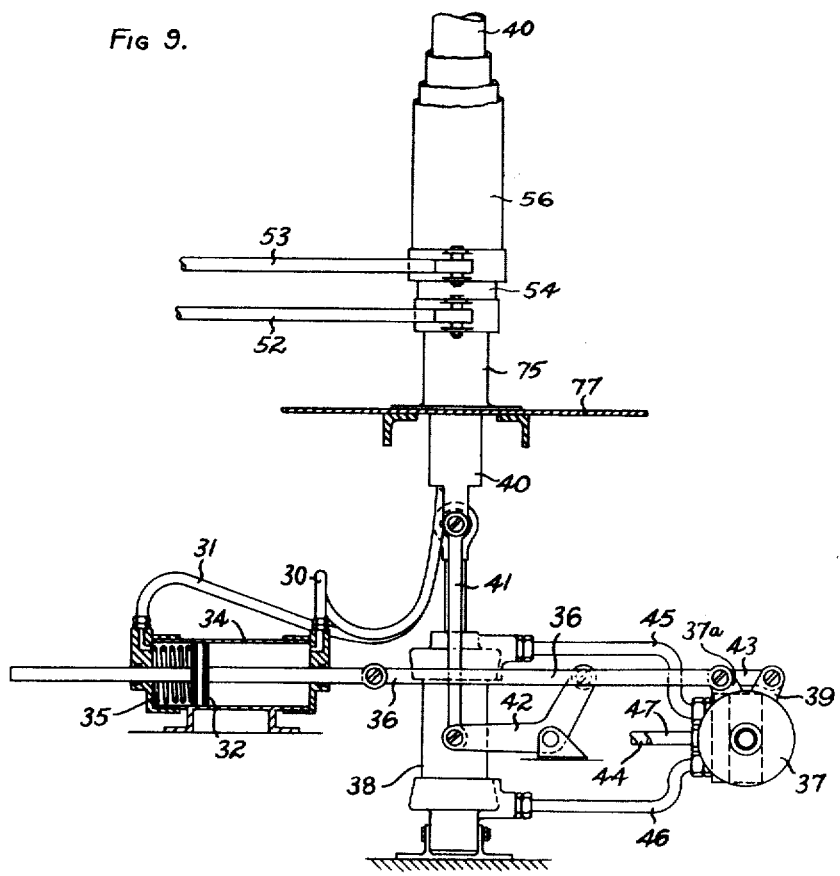
Fig. 9 is a fragmentary side view of the rotor pitch control actuators partly in section.
Figure 7:
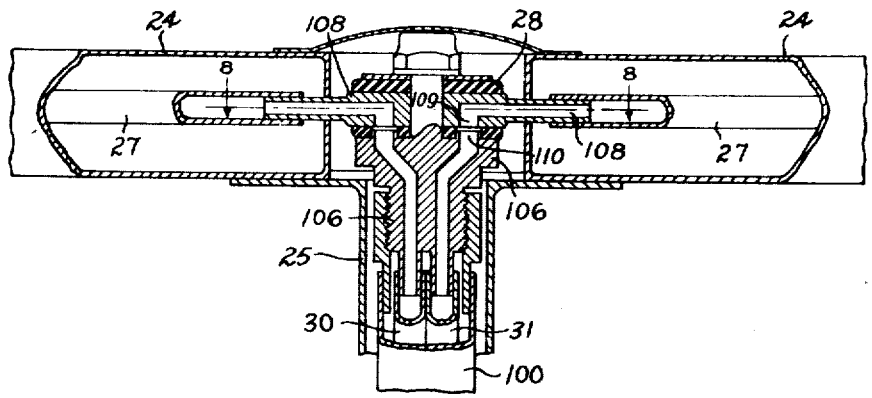
Fig. 7 is a fragmentary section of the control arms along line 7—7 of Fig. 1.

The selection of the contour according to the advance ratio of the aircraft is done automatically by the mechanism shown in Figs. 4, 7 and 9. A pair of streamline hollow control arms 24 are rotatably mounted on shaft 25 which is carried by and in position above the hub 14; at their outer ends the blades carry the oppositely facing Venturi openings 26. As will be evident the two venturis during rotation alternately assume advancing and retreating positions. Tubes 27 communicate with the respective Venturi openings and are connected through valve 28 (Fig. 7) and tubes 30 and 31 respectively to opposite sides of piston 32 in cylinder 34, Fig. 9. As shown, the piston is normally loaded or biased in one direction by means of spring 35. The valve 28 is so constructed that as the control arms 24 rotate, the retreating venturi 26 always communicates suction to one side of the piston through tube 30 and the advancing venturi 26 always communicates suction to the other or spring loaded side of the piston through tube 31. The difference in suction force is carried through rod 36 to the follow-up valve 37 serving the hydraulic jack 38 which in turn moves the cam 16 axially the proper amount by means of the tubular shaft 40 through which an operating connection is established. The cam 16 is stopped at the proper point by the action of rod 41, crank 42 and rod 43 attached to the follow-up arm 39 of valve 37.

The jack 38 is supplied with fluid under pressure from some suitable source (not shown) from which it flows via tube 44 to valve 37 and then to jack 38 by either tube 45 or 46 to cause selective movement thereof. Fluid returning from the jack to valve 37 passes to the source via tube 47.

Manual control is obtained by shifting the cam 16 laterally and longitudinally by the pilot's stick (not shown). The pilot's stick actuates rods 52 and 53 by suitable links and bellcranks in the manner well known in the art. Movement of rod 52 for example is caused by motion of the stick to cause an upward or downward pitch and movement of rod 53 similarly responds to a movement of the stick to cause roll. These rods in turn rotate concentric tubular shafts 54 and 56 respectively. Gears 58 and 60 are fastened on the upper ends of the shafts 54 and 56 respectively. These gears mesh respectively with gear sets 62 and 64. There are four gears in each set, each fixed eccentrically to a corresponding cam. Cams 63 are fastened by suitable shafts 65 to gears 62, and cams 66 are similarly fastened by shafts 67 to gears 64 as shown in Figs. 4 and 6. The cams all engage in recesses 63a and 66a formed internally of cam 16 and thus as these small cams are rotated, the large cam 16 is shifted laterally or longitudinally, sliding on plate 68 and top of gear box 69. Cam 16 is recessed at the top and bottom to receive the plates 68 and the top plate of the gear box 69, respectively.

The small cams 63 and 66 all bear on the side wall surface of the recesses 63a and 66a in the upper and lower faces of the cam 16. For longitudinal shifting of cam 16 only the cams 66 are rotated, cams 63 remaining still. The cams 66 are rotated simultaneously through operation of control rod 53 and always keep contact with the surface of recesses 66a. Similarly, cams 63 bear against recesses 63a and under control of rod 52 provide for the lateral guidance of cam 16. Obviously if cam set 63 is rotated at the same time as 66 the cam 16 moves both laterally and longitudinally.

Figure 1:
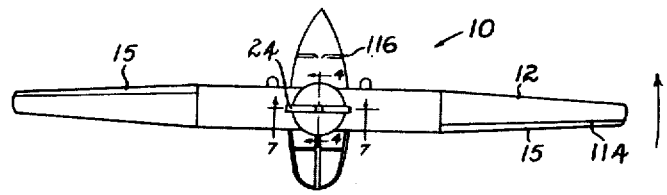
Fig. 1 is a top plan view of the aircraft constructed in accordance with the present invention.
Figure 2:
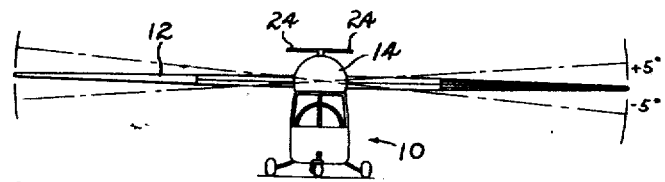
Fig. 2 is a front elevation of the aircraft.
Figure 3:
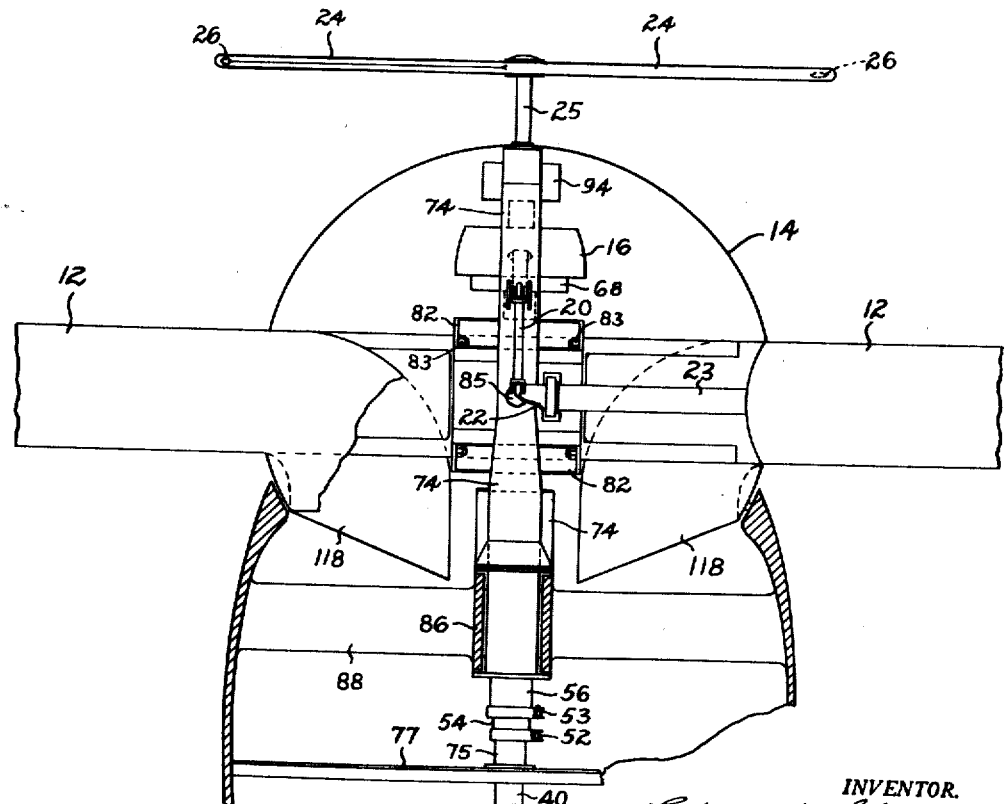
Fig. 3 is a fragmentary front view of the hub partly in section.

When the cam 16 is shifted vertically by action of shaft 40 and jacks 38, the whole assembly, consisting of shafts 54 and 56, gears 58 and 60, and the gear box 69, is shifted vertically also. The shaft 56 (Fig. 4) slides in bearing 72 of shaft 73 fastened to hub cage 74 while the cam 16 slides on fixed shaft 75 using bearings 76. The shaft 75 is attached to frame 77, Fig. 3, and does not rotate.

Tube 40 at its upper end is attached to the cam 16 by means of a bolt 78 fixed in the tube head 40a and passing slidably through a slot 79 in the tube 75.

Referring to Figs. 4 and 6, the cyclic control cam 16 is supported for vertical sliding on the bearings 76 as already described. These bearings are fixed in the square housing 80 of the cam which is supported between plate 68 and the top of gear box 69 by bolts 81 passing through the four arms 81a and the spacers 81b. The cam is guided in its transverse motion by the plate 68 fixed to housing 80 and the upper plate of the gear box 69 which is also fixed to housing 80.

The two rotor blades are fastened together rigidly by means of hub fitting 82. The hub fitting is pivoted on the hub cage 74 by pins 84 and 85, thus allowing the blades to flap about their common axis 84—85. The hub cage 74 is supported by shaft 86 in frame 88 (see Figs. 3 and 4) and rotates with the rotor blades around the cam 16 and its supporting shafts. At the top of shaft 75 is fastened a gear 90. Gear 90 meshes with gear 92 of hub cage gear box 94 which in turn drives gear 96. Gear 96 meshes with gear 98 of the control arm shaft 25. Since shaft 75 is stationary while the hub cage rotates, gears 92, 96 and 98 will rotate the streamlined control arms 24.

Figure 8:
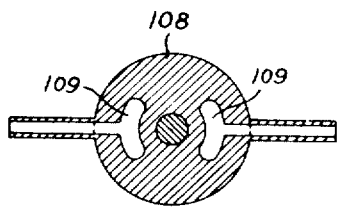
Fig. 8 is a section along the line 8—8 of Fig. 7.

The small shaft 100 inside shaft 25 is fixed at its lower end to shaft 75 by means of threaded insert 104 (Fig. 4). Fixed to the upper end of shaft 100 is the stationary half 106 of valve 28. The movable half 108 of valve 28 rotates with the control arms 24 so that the venturi in the retreating position as shown is always connected to the proper section 106 of the valve via openings 109 (Fig. 8).

It will be understood that the lower half 106 of the valve 28 remains fixed in the aircraft. The valve port 110 in 106 on the retreating side of the rotor axis is always connected to tube 31. Hence, whenever a venturi rotates into the retreating position, opening 109 is made to register with 110. Thus only pressure from the venturi in the retreating position is transmitted through tube 31. In a like mode of operation, tube 30 receives pressure only from a venturi in the advancing position.

Propulsion is accomplished by air jets of large mass expelled through slots 114 in the blades 12 extending along the outer 50 or 60 per cent of the radius. The air is inducted from the sides of the fuselage through a peripheral slot 116 by a blower which discharges the compressed air into the rotor hub. It then flows through ducts 118 tipward in the blade to the blade slots.

When the helicopter is hovering in still air the contactor 18 is in contact with the circular contour E—E at the bottom of the cam 16. As forward flight is initiated and as the speed of flight increases, the cam 16 is shifted vertically to put other contours in contact with the contactor.

When the aircraft begins to ascend in still air the contactors 18 will be in contact with the lower contour E—E which is a circle as remarked. The blades will then have the same flap settings for all orbital positions. When the airplane experiences a horizontal relative wind, the venturis 26 will transmit different suction effects to the cylinder 34, thus sensing and being responsive to the advance ratio of the aircraft. The advancing venturi will transmit suction via tube 30 and the venturi in the retreating position will transmit suction via tube 31. These suctions will determine the position of the piston 32 along the axis of cylinder 34. The movement of the piston 32 will open valve 37 to pass fluid to the jack 38 which moves shaft 40 and cam 16 vertically. A linkage 41—42—43 connecting the shaft 40 to follow-up valve 37 will cut off the flow of fluid at the position of shaft 40 determined by the displacement of piston 32.

The cam, due to the forward flight of the machine, will take up such a position, for instance, as to put the contactor in contact with contour D—D and the pitch of each blade will be varied throughout its orbit because of the cam contour D—D which is no longer circular. Since the contour is proper the blades will not see-saw about the axes of the pivots 84 and 85 although free to do so. The tendency to see-saw action of the blades will be effectively suppressed and would come into play only due to some momentary disturbance such as a gust.

It is to be under stood that, during any see-saw action, only the blades and the interconnecting fitting 82 partake of this action. The cage 74 rotates about its vertical axis while cam 16 and its supports are still. The cage 74 carries the contactor 18 about the cam 16 so that the contactor is moved by the variation in cam contour.

As the aircraft gains greater forward speed the venturis transmit a greater suction difference and cause a further elevation of cam 16.

If the pilot wishes to make a maneuver, he shifts cam 16 horizontally. This motion is accomplished by the rotation of the small cams 63 for lateral tilting of the plane of rotation of the blades, and by the rotation of the small cams 66 for longitudinal tilting of the plane of rotation of the blades.

It will now be clear that a cyclic pitch control has been provided which can provide different types of cyclic pitch patterns for the moment of a blade about its orbit. By this means the pitch can be correct for all orbital positions and independent of the pitch change being imposed at another point of the orbit. This control largely eliminates the blade forces which cause vibration.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In combination in a direct lift arcraft, a blade supported for rotation about an upright axis, means to vary the effective pitch of said blade, a cam having a plurality of closed camming contours, a sensing element engageable with said cam, means supporting said cam and said element for relative rotation and for controlled relative displacements both in the direction of and tranverse to said axis, means actuated by said element to control said pitch varying means cyclically in accordance with a said contour of said cam, means to move said cam relative to said element in the direction of said axis to select different contours for engagement with said element, a device responsive to the advance radio of said aircraft, and means operably relating said device and said cam moving means to displace said cam in the direction transverse to said axis in accordance with the change in the advance ratio of said aircraft.

2. In combination in an aircraft, a blade supported for rotation about an upright axis, means to vary the lift of said blade, a cam having a plurality of closed camming contours, a sensing element engageable with said cam, means supporting said cam and said element for relative rotation and for relative displacement with respect to each other, means for operably connecting said element to said lift varying means to alter the lift of said blade cyclically in response to the shape of a said contour, on the aircraft means responsive to the advance ratio of the aircraft, and means controlled by said responsive means to displace said cam relative to said element to vary the cam contour engaged by said sensing element to establish correct cyclic control of the blade lift for varying advance ratios.

3. In combination in a direct lift aircraft, a blade supported for rotation about an upright axis, means to vary the effective pitch of said blade, a cam having a plurality of closed camming contours, a sensing element engageable with said cam, means supporting said cam and said element for relative rotation and for actuated relative displacements, means controlled by said element to control said pitch varying means cyclically in accordance with a said contour of said cam, means to move said cam relative to said element in one plane to select different contours for engagement with said element, sensing means rotatably mounted on said aircraft to gauge the advance ratio of said blade from the combined effects of rotation and the relative wind, and means responsive to said sensing means to displace said came relative to said element in a plane at right angles to said one plane to vary the cam contour in contact with said element in accordance with the change in the advance ratio of said blade.

4. In combination in a direct lift aircraft, a blade, means supporting said blade for rotation about a vertical axis, a cyclic control cam having a plurality of camming contours, a sensing element controlled by said cam, means supporting said cam and said element for rotation relative to each other, means to control the effective pitch of said blade cyclically according to a pattern determined by engagement of said element with a camming contour of said cam, means for supporting said cam for displacement transversely to said axis, bearing surfaces carried by said cam for guiding said cam in said transverse displacement, a plurality of control cams bearing on each said surface, and means to rotate said control cams bearing on opposite facing surfaces of said cyclic control cam to displace said cyclic control cam transversely to said axis.

5. In combination in an aircraft, a blade supported for rotation about an upright axis, means to vary the lift of said blade, cyclic control means having a plurality of control positions, a sensing element rotatable relative to and cooperating with said control means in a selected one of said control positions, means to shift said control means and said element relative to each other in directions at right angles to each other in the plane transverse to said upright axis to establish control of said sensing element in different control positions, means interconnecting said sensing element and said lift varying means to alter the lift of said blade in accordance with the control of said element by said control means, means responsive to the advance ratio of the aircraft, and means controlled by said responsive means for actuating said shifting means for establishing a selected one of said control positions.

6. In combination in an aircraft, a blade supported for rotation about an upright axis, means to vary the lift of said blade, cyclic control means having a plurality of control positions, a sensing element rotatable relative to and cooperating with said control means in a selected one of said control positions, means to shift said control means and said element relative to each other in directions at right angles to each other in the plane transverse to said upright axis to establish control of said sensing element in different control positions, means interconnecting said sensing element and said lift varying means to alter the lift of said blade in accordance with the control of said element by said control means, means responsive to the advance ratio of the aircraft, means controlled by said responsive means for actuating said shifting means in one direction to a predetermined control position, and additional means for shifting said cyclic control means relative to said sensing element in a direction at right angles to said one direction to establish a predetermined cyclic control of the lift of said blade.

EDWARD A. STALKER.

REFERENCES CITED

The following references are of record in the file of this patent:

UNITED STATES PATENTS

| Number | Name | Date |
|---|---|---|
| 1,403,624 | Pescara | Jan. 17, 1922 |
| 1,449,129 | Pescara | Mar. 20, 1923 |
| 1,592,740 | MacNeil | July 13, 1926 |
| 2,414,435 | Bendix | Jan. 21, 1947 |
| 2,425,651 | Stalker | Aug. 12, 1947 |
| 2,493,042 | Stalker | Jan 3, 1950 |

FOREIGN PATENTS

| Number | Country | Date |
|---|---|---|
| 610,434 | Germany | Mar. 12, 1935 |